US006928876B2

(12) United States Patent
Campbell

(10) Patent No.: US 6,928,876 B2
(45) Date of Patent: Aug. 16, 2005

(54) DUAL FLEXURE PLATE ANGULAR ACCELEROMETER

(75) Inventor: Ray F. Campbell, Newport Beach, CA (US)

(73) Assignee: The Boeing Company, Chicago, IL (US)

( * ) Notice: Subject to any disclaimer, the term of this patent is extended or adjusted under 35 U.S.C. 154(b) by 5 days.

(21) Appl. No.: 10/707,010

(22) Filed: Nov. 13, 2003

(65) Prior Publication Data

US 2005/0103106 A1    May 19, 2005

(51) Int. Cl.[7] ........................................... G01P 15/125
(52) U.S. Cl. ............................. 73/514.32; 73/514.02; 244/3.2
(58) Field of Search ...................... 73/514.02, 514.32, 73/510; 318/649; 244/3.2; 701/3

(56) References Cited

U.S. PATENT DOCUMENTS 4,601,206 A  *  7/1986  Watson ......................... 73/510
5,831,164 A  *  11/1998  Reddi et al. ............. 73/514.01
6,662,654 B2 *  12/2003  Miao et al. .................... 73/488

* cited by examiner

*Primary Examiner*—John E. Chapman
(74) *Attorney, Agent, or Firm*—Justin H. Purcell; Artz & Artz, PC

(57) ABSTRACT

A dual capacitance accelerometer system includes two flexure plates coupled to the housing and defining a respective parallel flex axes. A fixed plate is adjacent to and in substantially parallel relation to the two flexure plates and is also coupled to the housing. The fixed plate and one of the flexure plates define a first distance and the fixed plate and the other flexure plate define a second distance. The first and second distances vary in response to acceleration forces acting upon the flexure plates.

17 Claims, 5 Drawing Sheets

DUAL FLEXURE PLATE ANGULAR ACCELEROMETER

BACKGROUND OF INVENTION

The present invention relates generally to capacitive accelerometers, and more particularly, to a flexure plate angular accelerometer.

It is well known that capacitive accelerometers measure the acceleration, vibration and the inclination of objects to which they are attached. These objects typically include missiles, spacecraft, airplanes and automobiles.

In general, capacitive accelerometers change electrical capacitance in response to acceleration forces and vary the output of an energized circuit. Capacitive accelerometer systems generally include sensing elements, including capacitors, oscillators, and detection circuits.

The sensing elements include at least two parallel plate capacitors functioning in differential modes. The parallel plate capacitors generally operate in sensing circuits and alter the peak voltage generated by oscillators when the attached object undergoes acceleration.

When subject to a fixed or constant acceleration, the capacitance value is also a constant, resulting in a measurement signal proportional to uniform acceleration.

This type of accelerometer can be used in a missile or in a portion of aircraft or spacecraft navigation or guidance systems. Accordingly, the temperature in the operating environment of the accelerometer changes over a wide range. Consequently, acceleration must be measured with a high accuracy over a wide range of temperatures. This is often a difficult and inefficient process.

The disadvantages associated with current capacitive accelerometer systems have made it apparent that a new capacitive accelerometer is needed. The new accelerometer should substantially minimize temperature sensing requirements and should also improve acceleration detection accuracy. The present invention is directed to these ends.

SUMMARY OF INVENTION

A dual capacitance accelerometer including a housing further includes a first flexure plate defining a first flex axis and coupled to the housing. A second flexure plate, fixed within the housing, is spaced apart from the first flexure plate and defines a second flex axis in parallel relation to the first flex axis. A fixed plate adjacent to and in substantially parallel relation to the first and second flexure plates is also coupled to the housing. The fixed plate and the first flexure plate define a first distance, and the fixed plate and the second flexure plate define a second distance. The first and second distances vary in response to acceleration forces acting upon the first flexure plate and the second flexure plate.

In accordance with another aspect of the present invention, a method for operating a dual flexure plate accelerometer system includes accelerating a first flexure plate and a second flexure plate in relation to a fixed plate, thereby causing a first distance between the fixed plate and the first flexure plate to change and thereby causing a second distance between the fixed plate and the second flexure plate to change. The method further includes generating a first frequency signal including a sum of a linear acceleration and an angular acceleration acting on the first flexure plate and generating a second frequency signal including a difference of a linear acceleration and an angular acceleration acting on the second flexure plate. An angular acceleration signal is generated from a difference of the first frequency signal and the second frequency signal.

One advantage of the present invention is that it generates a dynamic range and granularity sufficient for Inter-Continental Ballistic Missile (ICBM) usage. Additional advantages include that the accelerometer system consumes less power than prior accelerometer systems, while dramatically improving reliability and reduction in manufacturing costs.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF DRAWINGS

In order that the invention may be well understood, there will now be described some embodiments thereof, given by way of example, reference being made to the accompanying drawings, in which.

DETAILED DESCRIPTION

The present invention is illustrated with respect to a dual flexure plate angular accelerometer, particularly suited to the aerospace field. The present invention is, however, applicable to various other uses that may require accelerometers, such as any system requiring position and velocity measurements under extreme conditions, as will be understood by one skilled in the art.

Figure 1:
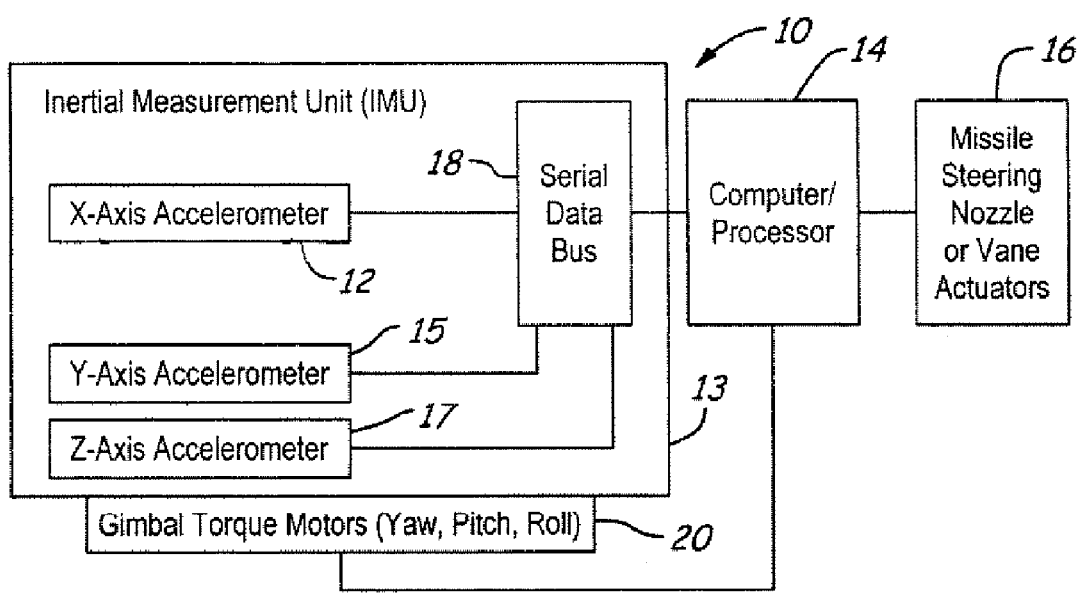
FIG. 1 illustrates an aerospace system including an accelerometer system in accordance with one embodiment of the present invention.

Referring to FIG. 1, the missile or aerospace system 10, including a dual flexure plate angular accelerometer system 12 (DFPAA) within an inertial measurement unit 13, is illustrated. The aerospace system 10 is merely an illustrative example of an accelerating object and is not meant to be limiting. For example, the present dual flexure plate angular accelerometer 12 could be implemented in any accelerating object to sense acceleration forces, including any type of vehicle or missile system, such as a Minuteman III missile system or a Scud missile system.

The illustrated aerospace system 10 includes an inertial measurement unit 13 including three dual flexure plate angular accelerometers (first) 12, (second) 15, (third) 17 and a serial data bus 18. The three accelerometers, the x-axis accelerometer 12, the y-axis accelerometer 15, and the z-axis accelerometer 17, are coupled to gimbals and gimbal torque motors 20 (yaw, pitch and roll motors). The accelerometers 12, 15, 17 are also coupled to the serial bus 18, which transfers information to a computer/processor 14. The computer 14 is coupled to the missile steering nozzle (or vane actuators) unit 16 and the gimbal torque motors 20.

The dual flexure plate angular accelerometer 12 is a single axis accelerometer that generates a robust wide dynamic range of performance. Important to note is that alternate embodiments of the present invention have one or more accelerometers, the three illustrated accelerometers 12, 15, 17 are only one example of a possible arrangement of accelerometers, and any number of accelerometers can be utilized.

Figure 4:
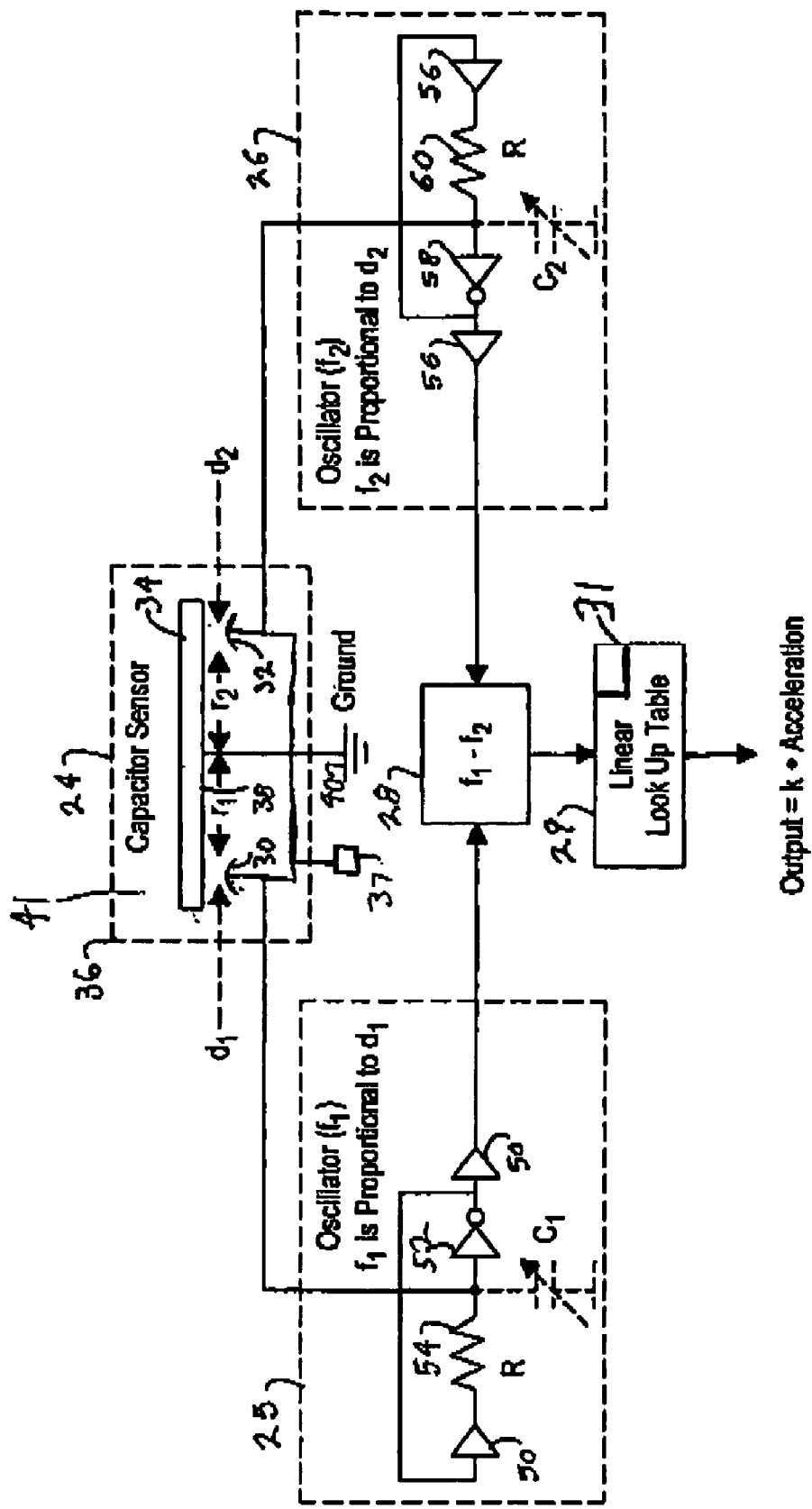
FIG. 4 illustrates a side view of the accelerometer system of FIG. 3.

Referring to FIGS. 1 and 4, an example of a possible configuration for the accelerometer 12 is included as an illustrative example of the three accelerometers 12, 15, and 17. The accelerometer 12 is part of an inertial measurement unit 13 (IMU), as was previously discussed. The accelerometer 12 includes a shared capacitor sensor 24, two oscillators 25, 26, a frequency subtraction device 28, and a Linear Lookup Table (LLT) or linearizer 29.

The shared capacitor sensor 24 includes two parallel flexure plates 30, 32, a single fixed plate 34, and a metal housing structure 36. The shared capacitor sensor 24 generates phase shift capacitance signals as a function of a periodic signal from the signal generator 37 and in response to acceleration of the aeronautical system 10, as will be discussed later.

The flexure plates 30, 32 are positioned substantially parallel to one side of the fixed plate 34 such that the first flexure plate 30 plate is a first distance ($d_1$) from the side 38 of the fixed plate 34, and the second flexure plate 32 is a second distance ($d_2$) from the side 38 of the fixed plate 34. The flexure plates 30, 32 are affixed to the metal housing structure 36 through at least a portion of at least one edge of each of the flexure plates 30, 32. The fixed plate 34 is coupled to the housing structure 36 and to a ground 40. The plates, 30, 32, and 34 are embodied herein as coupled to one side 41 of the housing 36; however, numerous other attachment configurations could also be used.

One embodiment of the present invention includes the three accelerometers 12, 15, and 17 each having a fixed plate, two flexure plates, a pair of oscillators, a frequency subtraction device, and a linearizer. The orientation of the flex axis of the accelerometers 12, 15, and 17 are orthogonal, however numerous alternate orientations are embodied herein, as will be understood by one skilled in the art.

The flexure plates 30, 32 are rigidly fixed to the metal housing structure 36 through almost any manner known in the art. Resultantly, all the system flexure is generated within the flexure plates 30, 32, which generally increases reliability and robustness of the system 10. This, however, generates a non-linear output from the flexure plates 30, 32, which will be discussed regarding the linear lookup table linearizer 29.

A gas or vacuum environment is enclosed within the sensor 24 through the metal housing structure 36 such that there is no interference with the movement of the flexure plates 30, 32 other than the acceleration of the system 10 along a perpendicular axis. During acceleration, the flexure plate 30 flexes according to the reaction force of Newton's second law of motion, force=mass×acceleration (F=ma), causing the distance between the flexure plates 30, 32 and the fixed plate 34 to vary, thus creating the two variable capacitors, one on each end of the fixed plate 34.

The combination of the first flexure plate 30 and the fixed plate 34 forms a first parallel plate capacitor, and the combination of the second flexure plate 32 and the fixed plate 34 forms the second parallel plate capacitor. The equivalent capacitor for the first parallel plate capacitor is illustrated in broken lines as $C_1$, and the equivalent capacitor for the second parallel plate capacitor is illustrated in broken lines as $C_2$.

The capacitance of the parallel plate capacitors is illustrated by $$C \cong (\epsilon_0 A)/d$$

where $\epsilon_0$ is the permittivity constant, A is the area of a fixed plate 34 (if I is the length of one side and the cross section of the plate is square, then $A=I^2$) and d is the effective distance between the fixed plate 34 and one of the flexure plates 30, 32. The first flexure plate 30 is coupled to the metal housing structure 36 and positioned a first distance ($d_1$) from the flexure plate 30. The first flexure plate 30 and the fixed plate 34 form a first capacitor whose operation is also governed by the equation $$C \cong (\epsilon_0 A)/d.$$

The fixed plate 34 responds to movement of the first flexure plate 30 when $d_1$ either increases or decreases, thereby generating a first phase shift capacitance signal. The second flexure plate 32 is also coupled to the metal housing structure 36 and positioned a second distance ($d_2$) from the fixed plate 34. The second flexure plate 32 and the fixed plate 34 form a second capacitor whose operation is governed by the equation $$C \cong (\epsilon_0 A)/d.$$

The fixed plate 34 responds to movement of the second flexure plate 32 when $d_2$ either increases or decreases, thereby generating a second phase shift capacitance signal.

The distances ($d_1$ and $d_2$) between the fixed plate 34 and the flexure plates 30, 32 are a function of acceleration and are proportional or equal when the system 10 is at rest. Each flexure plate 30, 32 is connected to a respective oscillator 25, 26, which generates the phase shift capacitance necessary for predictable oscillation.

The distance, d, is the acceleration variable (F=ma), which determines oscillator frequency, f, and f=kd. As the flexure plates 30, 32 sense acceleration, either linear (F=ma) or angular-tangential, each flexure plate will deflect in response to the sum of the forces acting thereon. Because the control mechanism keeps the flexure plates in the xy-plane, the total acceleration seen by each flexure plate is the sum of the linear acceleration and the tangential acceleration ($a_l+a_t$). This generates output frequency $f_1=(a_l+a_t)k$ and $f_2=(a_l+a_t)k$. For equal distances of $r_1$ and $r_2$, the expression $f_1=k_1 a_l+k_2\ a_t$ and $f_2=k_3 a_l-k_4\ a_t$, where $k_1$ and $k_3$ are equal if $r_1=r_2$. Otherwise they are calculated or modeled for the exact expression. In this simplified case, however, $f_1-f_2=(k_2\ a_t)-(-k_4\ a_t)$ and therefore $a_t(f_1-f_2)/2^*k$.

The first flexure plate 30 is coupled to the first oscillator 25, and the second flexure plate 32 is coupled to the second oscillator 24. The two oscillators 25, 26 are coupled to a frequency subtraction device 26, and the frequency subtraction device 26 is coupled to the LLT 28, which is coupled to a processor 14 (missile operations processor). The processor 14 is coupled to an actuator 16, which is coupled to various system components, such as thrusters and attitude control devices.

The oscillators 25, 26 are ideally precision designs utilizing GaAs or similar material. The oscillators 25, 26 are also mounted on the metal housing structure 36 in the present embodiment.

The embodied first oscillator 25 includes components well known in the art. Although the embodied oscillator is a common oscillator type, one skilled in the art will realize that numerous other types of oscillators will also be adaptable for the present invention. The various components include, but are not limited to, two buffers, 50, an inverter 52, and at least one resistor 54. The first oscillator 25 receives the phase shift capacitance signal from the first flexure plate 30 and generates therefrom a frequency signal ($f_1$), which is proportional to $d_1$.

The second oscillator 26 receives the phase shift capacitance signal from the second flexure plate capacitor and generates therefrom a second frequency signal ($f_2$), which is proportional to $d_2$. The embodied oscillator 26 is similar to the first oscillator 25 and also includes a set of buffers 56, an inverter 58, and at least one resistor 60.

The frequencies ($f_1$ and $f_2$) are functions of the distances ($d_1$ and $d_2$) respectively. As the flexure plates 30, 32 flex, one capacitor increases and the other decreases, thereby causing one oscillator 25 to increase output frequency and the other oscillator 26 to decrease output frequency.

The frequency subtraction device 28 receives the oscillator signals ($f_1$ and $f_2$) and generates the difference thereof, i.e. $f_1-f_2$. Important to note is that the polarities of both $f_1$ and $f_2$ are determined before this difference is calculated. An overall frequency signal is generated from the frequency subtraction device 28. In other words, the polarity of $f_1$ is positive if $d_1$ is increasing and negative if $d_1$ is decreasing. Likewise, the polarity of $f_2$ is positive if $d_2$ is increasing and negative when $d_2$ is decreasing. Determinations of increasing or decreasing $d_1$ and $d_2$ may generate from, for example, by the processor 14.

A linearizer 29 or LLT receives the overall frequency signal. The linearizer 29 compensates for both the nonlinear function generated from the frequency subtraction device 28 and any manufacturing anomalies, as will be understood by one skilled in the art. The linearizer 29 value is established in manufacturing through taking large samples of performance curves, as will be understood by one skilled in the art. The linearizer 29 output is a digital word whose magnitude is proportional to the acceleration of the system 10 in either direction along an axis perpendicular to the flexure plates 30, 32.

Numerous alternate linearizers are also included in the present embodiment whereby a substantially linear function can be generated by compensating for nonlinear functions, for example, in the digital domain, a digital linearizer is included. The output of the linearizer 29 is an acceleration signal multiplied by a constant (k).

Statistical filtering of the linearized data somewhere significantly above the maximum flexure frequency also occurs in either the linearizer 29 or the processor 14 to reduce the overall noise impact on the system 10. Herein, the filter 31 is included in the linearizer 29.

The processor 14 receives the output signals and generates a processor signal and response thereto. The processor 14 is embodied as a typical missile or airplane processor, as is familiar in the art.

The actuator, here embodied as missile steering nozzle or vane actuators 16 receives the processor signal and activates system components (e.g. object control devices) in response thereto. System components include for example, thrusters or attitude control devices.

Figure 2:
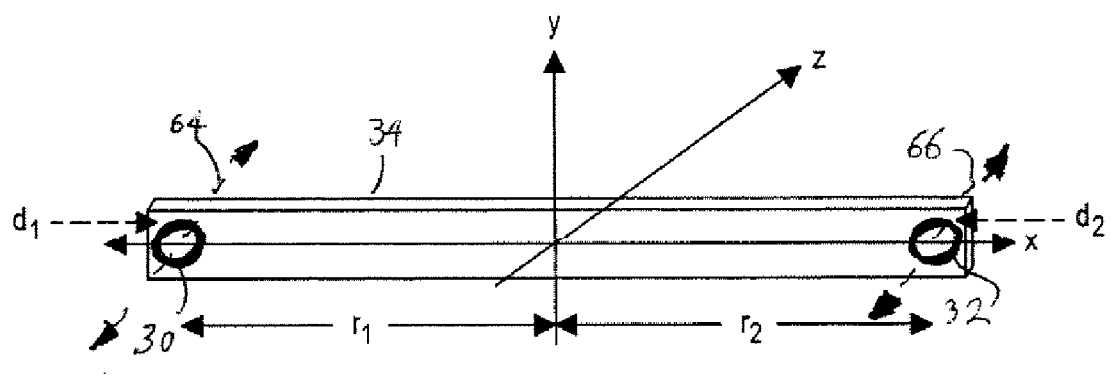
FIG. 2 illustrates an accelerometer system in accordance with FIG. 1.
Figure 3:
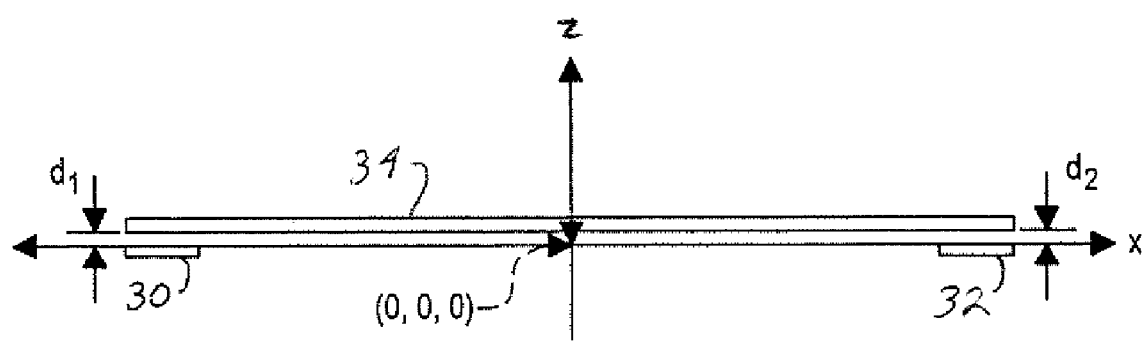
FIG. 3 illustrates a perspective view of an accelerometer system in accordance with FIG. 1.

Referring to FIGS. 3 and 4, the angular accelerometer 12 of FIG. 2 is further illustrated. The angular accelerometer 12 includes the two flexure plates 30, 32 and the fixed metal plate 34.

The first flexure plate 30 is positioned a distance $r_1$ from a central y-axis or the z spin axis, and the second flexure plate 32 is positioned a distance $r_2$, from the central y-axis or the z spin axis. Both flexure plates 30, 32 are represented as plates having flex axes 64, 66 parallel to the y-axis. Embodiments include multiple fixed plates or a single plate. The present embodiment, for simplicity, illustrates a single common fixed plate 34.

One embodiment of the present invention includes the faces of the plates in the xy-plane, perpendicular to the z-axis at distances $r_1$ and $r_2$ from the coordinate origin. Numerous other arrangements are also included herein, such as the faces of the plates in the yz or xz planes for alternate configurations.

For the present invention, $r_1=r_2$. This is merely one embodiment, and in fact, they may be both on either side of the origin, as long as they are separated by a known distance, and at a known distance from the origin.

The accelerometers 12, 15, and 17 are herein included on an inertial platform. The platform may be a gimbal 20 or alternate inertial platform design known in the art. The system 10 utilizes the generated signals from the accelerometers 15, 17 to control the platform position to maintain a near zero rotation.

Figure 5:
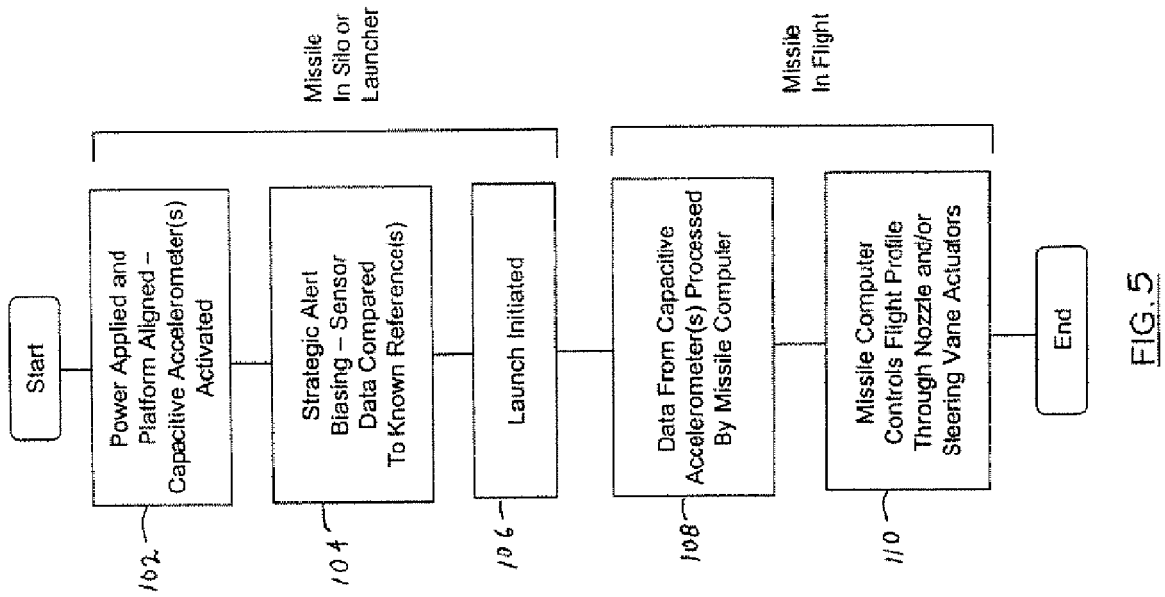
FIG. 5 illustrates a logic flow diagram of the aeronautical system of FIG. 1 in operation, in accordance with another embodiment of the present invention.

Referring to FIG. 5, a logic flow diagram 100 illustrating a method for acceleration control is illustrated. Logic starts in operation block 102 where power is applied to the system, the missile platform is aligned and the capacitive accelerometer is activated.

In operation block 104, strategic alert biasing occurs and sensor data is compared to a known reference.

In operation block 106, the missile system 10 is launched.

In operation block 108, the missile system 10 accelerates and the flexure plate flexes to either increase or decrease $d_1$ or $d_2$ for any of the three accelerometers 12, 15, or 17. The oscillator activates and receives signals from the fixed plate capacitors which are generated in response to a change in either $d_1$ or $d_2$. Notably, a change in $d_1$ will resultantly cause a change in $d_2$. The oscillators 25, 26 then generate frequency signals in response to the fixed plate capacitor signals. The frequency from the first oscillator 25 is subtracted from the frequency from the second oscillator 26 to generate a nonlinear overall frequency signal.

In operation block 108, the overall frequency signal, i.e. the results of the acceleration, are linearized. This linearization is achieved through a linear lookup table (linearizer 29), or other linearization methods known in the art. Data from the accelerometer(s) is processed by the missile computer or attitude controller.

In operation block 110, aeronautical systems respond to the acceleration. In other words, the controller receives a signal indicating that acceleration of the system 10 has changed. In response to this change, for example, thrusters are activated to compensate for the acceleration change. In other words, the missile computer/controller/processor 14 controls the flight profile through the missile nozzle or steering vane actuators 16.

In operation, a method for operating a dual flexure plate accelerometer system 12 includes accelerating a first flexure plate 30 and a second flexure plate 32 in relation to a fixed plate 34, thereby causing a first distance between the fixed plate 34 and the first flexure plate 30 to change and thereby causing a second distance between the fixed plate 34 and the second flexure plate 32 to change. The method further includes generating a first frequency signal including a sum of a linear acceleration and an angular acceleration acting on the first flexure plate 30 and generating a second frequency signal including a difference of a linear acceleration and an angular acceleration acting on the second flexure plate 32. An angular acceleration signal is generated from a difference of the first frequency signal and the second frequency signal.

From the foregoing, it can be seen that there has been brought to the art a new and improved accelerometer system 12. It is to be understood that the preceding description of the preferred embodiment is merely illustrative of some of the many specific embodiments that represent applications of the principles of the present invention. For example, a vehicle, such as an airplane, spacecraft, or automobile could include the present invention for acceleration detection and control. Numerous and other arrangements would be evident to those skilled in the art without departing from the scope of the invention as defined by the following claims.

What is claimed is:

1. A dual capacitance accelerometer having a signal generator comprising:
    a housing;
    a first flexure plate coupled to said housing and defining a first flex axis;
    a second flexure plate fixed within said housing spaced apart from said first flexure plate and defining a second flex axis in parallel relation to said first flex axis; and
    a fixed plate adjacent to and in substantially parallel relation to said first and second flexure plates, said fixed plate coupled to said housing, said fixed plate and said first flexure plate defining a first distance and said fixed plate and said second flexure plate defining a second distance,
    wherein said first and second distances vary in response to acceleration forces acting upon said first flexure plate and said second flexure plate, and wherein a first phase shift capacitance signal is generated as a function of signals from the signal generator and from said first flexure plate and said fixed plate, and a second phase shift capacitance signal is generated as a function of signals from the signal generator and from said second flexure plate and said fixed plate.

2. The system of claim 1 further comprising a first oscillator receiving said first phase shift capacitance signal and generate a first frequency signal in response thereto.

3. The system of claim 2 further comprising a second oscillator receiving said second phase shift capacitance signal and generate a second frequency signal in response thereto; and
    a frequency subtraction device subtracting said second frequency signal from said first frequency signal and generate therefrom an overall frequency signal.

4. The system of claim 3 further comprising a linearizer receiving said overall frequency signal and generating therefrom a linearized acceleration signal including at least one of a linear or angular-tangential acceleration signal.

5. The system of claim 4 wherein said linearizer comprises at least one of a linear lookup table or a signal processor.

6. The system of claim 4 further comprising a system controller receiving said linearized acceleration signal and generating a system control signal in response thereto.

7. The system of claim 6 further comprising an actuator activating a system component in response to a system control signal.

8. The system of claim 7 wherein said system component comprises a thruster or an attitude control device.

9. A method for operating a dual flexure plate accelerometer system comprising:
    accelerating a first flexure plate and a second flexure plate in relation to a fixed plate, thereby causing a first distance between said fixed plate and said first flexure plate to change and thereby causing a second distance between said fixed plate and said second flexure plate to change;
    generating a first frequency signal including a sum of a linear acceleration and an angular acceleration acting on said first flexure plate;
    generating a second frequency signal including a difference of a linear acceleration and an angular acceleration acting on said second flexure plate; and
    generating an angular acceleration signal from a difference between said first frequency signal and said second frequency signal.

10. The method of claim 9 further comprising maintaining said first flexure plate and said second flexure plate in a state of equilibrium.

11. The method as in claim 10, wherein generating an angular acceleration signal from a difference of said first frequency signal and said second frequency signal further comprises linearizing a proportion of a difference of said first oscillator signal and said second oscillator signal.

12. The method of claim 11, wherein linearizing said difference of said first oscillator signal and said second oscillator signal further comprises determining polarities of said first oscillator signal and said second oscillator signal.

13. A system for controlling an accelerating object comprising:
    a first accelerometer comprising a first capacitor sensor comprising a housing, a first flexure plate, a second flexure plate, and a fixed plate coupled to said housing,
    said first flexure plate coupled to said housing a first distance from said fixed plate,
    a second flexure plate coupled to said housing a second distance from said fixed plate and arranged substantially parallel with said first flexure plate,
    said first flexure plate and said second flexure plate flexible responsive to acceleration forces whereby said first distance and said second distance vary as a function of said acceleration forces thereby generating a first acceleration signal including linear and angular-tangential acceleration information in response to change in said first distance and a second acceleration signal including linear and angular-tangential acceleration information in response to change in said second distance,
    a first oscillator receiving said first acceleration signal and generating a first frequency signal in response thereto,
    a second oscillator receiving said second acceleration signal and generating a second frequency signal in response thereto;
    a frequency subtraction device subtracting said second frequency signal from said first frequency signal and generating therefrom an overall frequency signal,
    a linearizer receiving said overall frequency signal and generating therefrom a linearized acceleration signal,
    an actuator activating an object control device in response to an acceleration control signal; and
    a system controller coupled to said first accelerometer and receiving said linearized acceleration signal and generating an acceleration control signal in response thereto, said controller further generating a flexure plate control signal to maintain said first flexure plate and said second flexure plate in a state of equilibrium.

14. The system of claim 13 wherein said object control device comprises at least one of a thruster, an attitude control device, a missile steering nozzle, or a vane actuator.

15. The system of claim 13 further comprising a filter filtering said linearized signal.

16. The system of claim 13 further comprising a second accelerometer and a third accelerometer, arranged with said first accelerometer to generate cross axis thrust data, wherein said first accelerometer is coupled to a yaw torque motor, said second accelerometer is coupled to a pitch torque motor, and said third accelerometer is coupled to a roll torque motor.

17. The system of claim 13, wherein said fixed plate comprises a plurality of fixed plates.

* * * * *